United States Patent Office 2,767,825
Patented Oct. 23, 1956

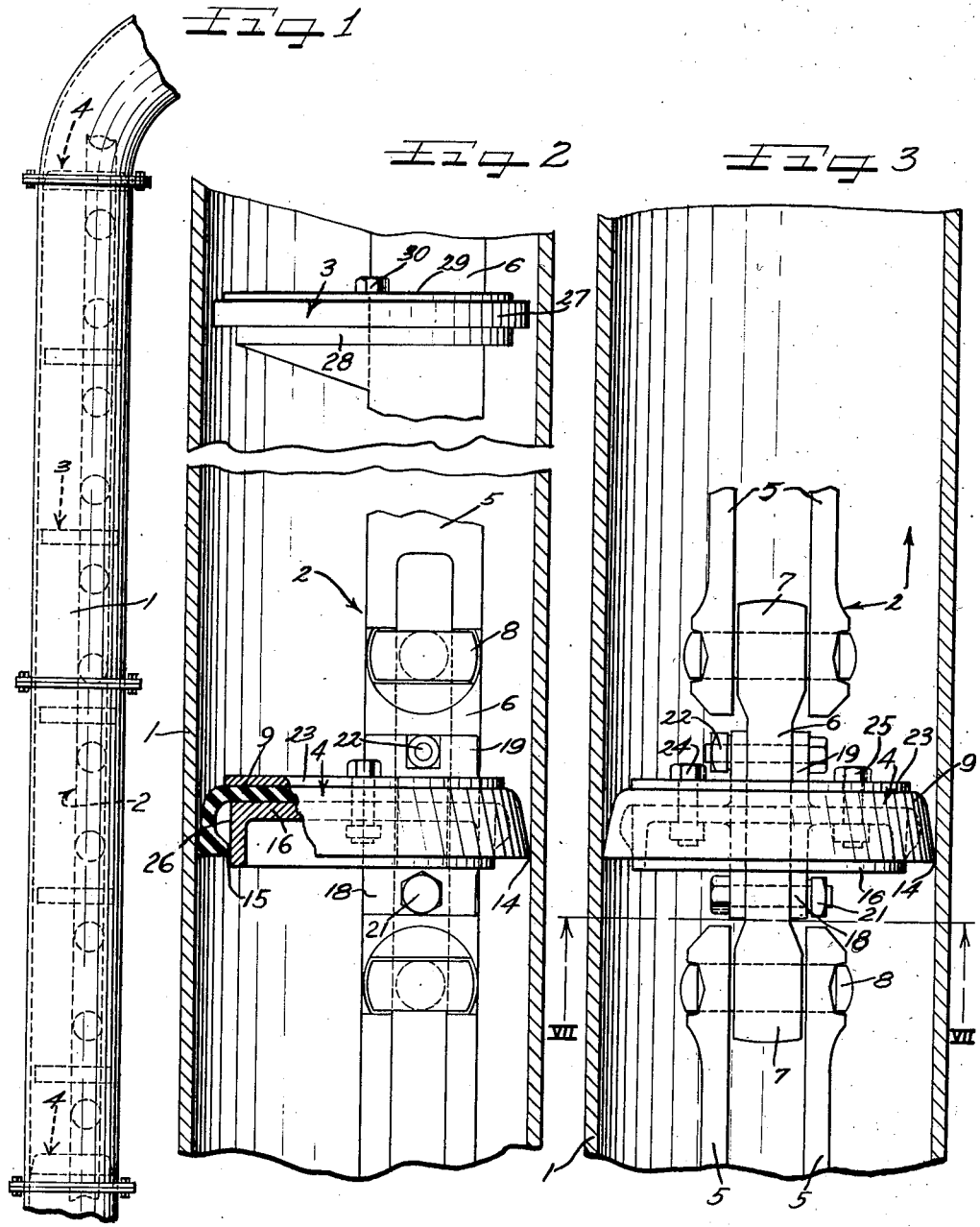

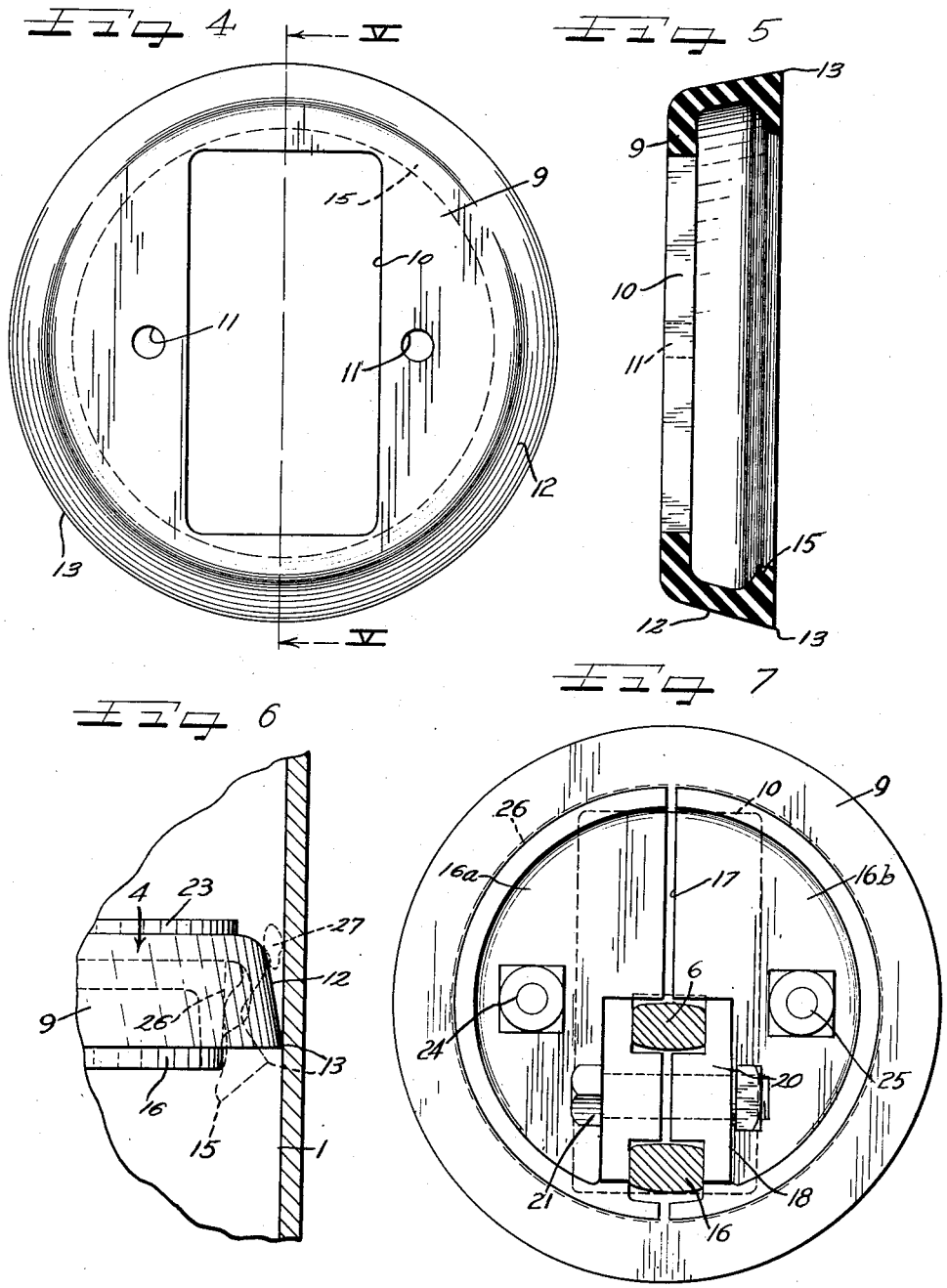

2,767,825

CONVEYOR FLIGHT AND ASSEMBLY

Clifford K. Welch, Brownsburg, Ind., assignor to Indiana Commercial Filters Corporation, a corporation of Indiana Application February 12, 1954, Serial No. 409,922

2 Claims. (Cl. 198—172)

This invention relates to improvements in a conveyor flight and assembly, and more particularly to a conveyor flight and assembly of the type embodying a flexible propelling element to which flights are attached at spaced intervals and which is designed for travel inside a pipe or tube, although the invention may have other uses and purposes as will be apparent to one skilled in the art.

In the past, many and various types of conveyor assemblies for operating inside a pipe or tube have been developed. In most cases, these assemblies comprised a flexible propelling member, such as a chain or cable, to which flights were attached at spaced intervals. These flights, as most frequently used at present, comprise a rubber or synthetic rubber disc-like element secured to the propelling member between backing plates to which the flight is secured by bolts or the like. The backing plates are not of as large a diameter as the flight, and the flight is not of a diameter to equal the inside diameter of the pipe or tube. There is a small space between the outer edge of the flight and the inside of the pipe or tube, and when conveying many different things through the tube, that space makes no difference. However, it has been found that conveyor assemblies heretofore known do not operate as efficiently as desired when conveying a very finely ground or powdery material, and especially when the pipe or tube has a vertical reach in excess of five feet and through which the conveyor assembly moves upwardly. In that event, and with certain materials it has been found that these materials tend to sift past the flights between the outer edges of the flights and the pipe or tube, so that the quantity of material actually delivered at the top of the vertical reach is much less than expected or desired.

With the foregoing in mind, it is an important object of the instant invention to provide a conveyor assembly for use in a pipe or tube, so constructed that it operates with adequate efficiency through vertical reaches of the pipe or tube as well as through horizontal reaches.

Another object of the invention is the provision of a flight for a conveyor operable inside a pipe or tube, which flight is designed to insure the carrying of substantially any kind of material through the pipe or tube including vertical reaches thereof.

It is also a feature of this invention to provide a flight for a conveyor assembly of the type operable in a pipe or tube, which flight may be utilized at spaced intervals between adjacent flights of different character, and which flight is specially designed to insure the conveyance of even fine or powdery material through vertical pipe or tube reaches as well as through horizontal or inclined reaches.

It is also a feature of this invention to provide what might be termed a sealing flight for a conveyor of the character designed to travel through a pipe or tube, which flight has contact at its edge or marginal portion with the inside wall of the pipe or tube, the flight being so constructed that it will give and be self-relieving in the event a hard lump of material becomes wedged between the edge of the flight and the inside wall of the pipe.

Still another object of the invention resides in the provision of a flight conveyor assembly, of the character designed for use in a pipe or tube, which utilizes a propelling element carrying flights at spaced intervals therealong, certain of said flights being of such a size as not to contact the interior of the tube all the way around therein, and others of the flights being of the character to establish what may be considered, in effect, a sealing engagement with the interior of the tube or pipe.

It is still another object of the instant invention to provide what may be termed a sealing flight for a conveyor of the character designed to operate in a pipe or the like, which sealing flight may be attached to the propelling element in the same manner as any other flight, and may be substituted here and there for another type of flight on the same propelling element to insure the adequate conveyance of substantially any material upwardly through a vertical pipe reach.

While some of the more salient features, characteristics and advantages of the instant invention have been above pointed out, others will become apparent from the following disclosures, taken in conjunction with the accompanying drawings, in which—

Figure 1 is a fragmentary side elevational view of a vertical pipe reach showing the use of a conveyor embodying principles of the instant invention therein;

Figure 2 is an enlarged fragmentary vertical sectional view through a portion of the structure illustrated in Fig. 1, showing more particularly the character of the flights utilized;

Figure 3 is an enlarged fragmentary vertical sectional view of the character of Fig. 2, but taken at an angle of 90° from the showing in Fig. 2;

Figure 4 is an enlarged leading face view of a conveyor flight embodying principles of the instant invention, disclosing the flight element alone, removed from the conveyor;

Figure 5 is a transverse vertical sectional view taken substantially as indicated by the line V—V of Fig. 4, looking in the direction of the arrows;

Figure 6 is a fragmentary enlargement of the central right-hand portion of Fig. 3, illustrating the operation of the flight of Fig. 4 when a potential block occurs; and Figure 7 is a transverse vertical sectional view through the conveyor assembly alone, taken substantially as indicated by the line VII—VII of Fig. 3.

As shown on the drawings:

Conveyors of the type herein illustrated and described are usually used in connection with a pipe circuit having turns, bends, and reaches extending in substantially any desired direction, depending upon where it is desired to move the material in a particular plant arrangement, and depending to a lesser extent upon the character of material being moved. Discharge openings or admission openings in the pipeline may be provided where deemed most expedient. To this end, in the drawings, I have illustrated merely a vertical reach 1 of a pipeline which may continue in other and various directions, and it will be assumed that the conveyor assembly traveling through the pipeline 1 moves upwardly through the vertical reach.

The conveyor assembly traveling through the pipe 1 embodies a propelling element generally indicated by numeral 2, this element in the illustrated instance being in the form of a link chain, which carries a series of spaced flights generally indicated by numeral 3, and at intervals a flight generally indicated by numeral 4 embodying principles of the instant invention. The propelling element or chain 2, in the illustrated instance, consists of a series of links flexibly coupled. The chain comprises like outer links 5 arranged in pairs, an inner link 6 with expanded ends 7 and an open central portion, this inner link being connected at one end to a pair of outer links 5 by double T-headed bolt 8, and at the opposite end to another pair of outer links 5 by a similar bolt, and so on, during the length of the chain. This specific chain is more particularly set forth and described in a J. H. Weston U. S. Letters Patent No. 870,704, issued November 12, 1907. In the present showing, the various flights are preferably attached to the inner links 6 by means of bolts passing through the central opening in each of these links. It is not essential that a flight be mounted on every inner link, as illustrated, but the flights may be spaced at greater intervals if so desired.

With reference now to Figs. 4 and 5, it will be seen that the actual conveying element of the flight generally indicated by numeral 4 comprises a cup-like rubber or synthetic rubber disc 9 provided with an elongated central aperture 10 as well as a pair of smaller apertures 11—11, substantially on the transverse diameter, to accommodate securing bolts. The outer edge portion of the flight is substantially sloping or tapering as indicated at 12, the diameter increasing away from the direction of travel, so that the trailing edge portion 13 is of maximum diameter, and of a size to intimately contact the interior of the pipe, as indicated at 14 in Figs. 2 and 3. The disc 9 or flight, therefore, effects what may be termed a sealing engagement with the interior of the pipe. The flight is also provided on its trailing side with an inwardly extending annular lip 15 defining a central aperture in the flight.

This element 9 is held in proper position by a rearwardly open cup-shaped disc-like element 16 preferably made of metal, and nested within the flight 9. This supporting disc 16 is preferably made in two separate halves 16a and 16b as seen in Fig. 7, the entire disc being split as indicated at 17 to facilitate mounting and removal of the flight. Integral with each half of the disc 16 is a rearwardly projecting bracket 18 and a forwardly projecting bracket 19 (Figs. 2 and 3), and as seen in Fig. 7, these brackets preferably have an inner extension as indicated at 20 to enter into the space between the upper and lower bars of the inner chain link 6. The confronting links on the rear or trailing side of the flight are secured together by a bolt and nut assembly 21 extending through the link, and the projecting brackets 19 on the leading side of the flight are preferably secured together by a similar bolt and nut assembly 22 but disposed in reverse position to the assembly 21; i. e., the head of the assembly 21 will be on the opposite side of the chain from the head of the assembly 22.

On the leading side of the flight or rubber element 9 is a disc-like front plate 23 which will, of course, have a recess in the lower portion sufficient to receive therein the leading projections 19—19 of the backing plate. The front plate and backing plates are united through the rubber element 9 by means of bolt and nut assemblies 24 and 25 which pass through the aforesaid apertures 11—11 in the rubber element 9. Thus, the entire flight assembly is firmly secured, but in a readily removable manner, to the propelling element or chain.

Now, with reference to Figs. 2 and 6, it will be seen that the inwardly extending lip 15 on the rubber element 9 rests upon the outer rim 26 of the cup-like backing plate 16, but that this rim extends rearwardly of the termination of the rubber element a short distance. Also, the rim 26 tapers, gradually decreasing in diameter toward the rear. This arrangement is such that should a hard lump or foreign particle, such as indicated by dotted lines at 27 in Fig. 6, become wedged between the rim 12 of the rubber element 9 and the pipe 1, the lip 15 of the element will slide rearwardly off the rim 26 of the backing plate as indicated by dotted lines in Fig. 6, the adjacent portion of the rubber element 9 will be accordingly inwardly compressed, and the obstacle or lump 27 may pass by the flight. It will be seen, therefore, that the conveyor flight is self-relieving in the event of a jam so that operation is continuous, regardless of the fact that the rubber element 9 effects contact with the inner wall of the pipe 1.

Of course, if so desired, all the flights on the conveyor assembly could be of the character of the flight 4. However, in nearly every instance and regardless of the character of the substance being conveyed, such a construction would be unnecessarily expensive and such a construction is not needed to effect proper conveyance of the material. Therefore, as seen in Fig. 1, the preferred method is to substitute a flight 4 periodically for one of the flights 3, and in the illustrated instance, every sixth flight is a flight 4.

With reference now to Fig. 2 it will be seen that the flights 3, of the character heretofore used, are more economical than the flights 4 and comprise a rubber disc-like element 27 of cylindrical formation, with a suitable opening to permit passage of the chain, and this element is backed on the rear with a backing plate 28, split if desired, and secured to the chain in substantially the same manner as the cup-like backing plate 16 above described. On the front, the flight 27 is provided with a relatively thin leading plate 29, and the two plates 28 and 29 are held by a pair of through bolt assemblies as indicated at 30. This flight is not of sufficient diameter to contact the pipe, and there is a definite space between the rim of the rubber disc 27 and the interior of the pipe.

Were the conveyor entirely made up of flight assemblies generally indicated by numeral 3 that do not contact the interior wall of the pipe, in a vertical reach of pipe finely ground or powdery material gravitates around the rim of the flight to such an extent that if the vertical reach exceeds five feet, an insufficient amount of the material is delivered at the top of the reach. However, when one of the flight assemblies 4 is substituted for a flight assembly 3, periodically along the conveyor, the rubber element 9 of the flight assembly 4 effects what may be termed a sealing contact with the interior wall of the pipe and no material gravitates thereby. Such arrangement causes the flight assemblies 3 to assume their fair share of the load, because there will not be room for material to gravitate past the flight assemblies 3 by virtue of the sealing engagement by the flight assembly 4, and much of that material will remain on the leading face of the flight assemblies 3 so that they will actually carry a fair share of the load traveling upwardly through a vertical reach. At the same time, should a lump of material wedge between the rim of the resilient element 9 and the pipe wall, that resilient element is self-relieving by virtue of the fact that the reinforcing lip 15 therein may slide off the tapered rim 26 of the backing means until the lump of material has been passed by, and then the rim due to its inherent resiliency will automatically assume its original position with the lip bearing against the rim 26.

It will be noted that the provision of the sealing and self-relieving flight at spaced points along the propelling element will add but a negligible amount to the cost of the entire conveyor and, by virtue of its construction the sealing flight is also very durable and long lasting. No different means are employed for attaching this flight to the propelling element than is the case with all of the other flights so assemblies and repairs may be accomplished in the same way.

It will be understood that modifications and variations may be effected without departing from the scope of the novel concepts of the present invention.

I claim as my invention:

1. In a conveyor flight, a cup-shaped resilient element having an inwardly tapering outer edge extending between a forward face and an open rear face, a reinforcing lip formed at said open rear face, a cup-shaped backing plate nested in said element and having an outer rim in contact with and extending beyond said lip, and means to secure said flight to a propelling member, the outer rim of said backing plate being tapered to permit said lip sliding off the rim if said element is compressed inwardly.

2. In a conveyor flight, a cup-shaped resilient element having an outer edge increasing in diameter front to rear, a cup-shaped backing plate nested in said element and attached thereto, said plate having an outer rim decreasing slightly in diameter front to rear, and said resilient element having an inwardly extending lip at its rear end normally riding the rim of said plate with the forward part of the edge of said element spaced from the plate rim, said lip sliding off the plate rim if the resilient element is compressed by an obstruction to permit the flight to pass by the obstruction.

References Cited in the file of this patent

UNITED STATES PATENTS

| Number | Name | Date |
|---|---|---|
| 158,075 | Hathaway | Dec. 22, 1874 |
| 346,960 | Temple | Aug. 10, 1886 |
| 405,928 | Temple | June 25, 1889 |
| 646,634 | Brosi | Apr. 3, 1900 |
| 872,423 | Hodell | Dec. 3, 1907 |
| 1,069,308 | Wilson | Aug. 5, 1913 |
| 1,274,219 | Ulbrecht | July 30, 1918 |
| 1,685,112 | Wilmot | Sept. 25, 1928 |
| 2,094,789 | Gellatly | Oct. 5, 1937 |
| 2,429,549 | Hapman | Oct. 21, 1947 |
| 2,595,941 | Hapman | May 6, 1952 |
| 2,609,081 | Hapman | Sept. 2, 1952 |
| 2,667,263 | Bigler et al. | Jan. 26, 1954 |